(12) United States Patent
MacLellan

(10) Patent No.: US 9,168,904 B2
(45) Date of Patent: Oct. 27, 2015

(54) INPUT AND OUTPUT RODS FOR VACUUM BRAKE BOOSTER

(75) Inventor: Patrick T. MacLellan, Plymouth, MI (US)

(73) Assignee: Kelsey-Hayes Company, Livonia, MI (US)

( * ) Notice: Subject to any disclaimer, the term of this patent is extended or adjusted under 35 U.S.C. 154(b) by 672 days.

(21) Appl. No.: 13/522,185

(22) PCT Filed: Jan. 26, 2011

(86) PCT No.: PCT/US2011/022601
§ 371 (c)(1),
(2), (4) Date: Jul. 13, 2012

(87) PCT Pub. No.: WO2011/094332
PCT Pub. Date: Aug. 4, 2011

(65) Prior Publication Data
US 2012/0272820 A1    Nov. 1, 2012

Related U.S. Application Data

(60) Provisional application No. 61/298,408, filed on Jan. 26, 2010.

(51) Int. Cl.
*B60T 13/52* (2006.01)
*F16J 1/14* (2006.01)
*B21D 7/00* (2006.01)
*B60T 11/18* (2006.01)
*B60T 13/567* (2006.01)

(52) U.S. Cl.
CPC . *B60T 13/52* (2013.01); *B21D 7/00* (2013.01); *B60T 11/18* (2013.01); *B60T 13/567* (2013.01); *F16J 1/14* (2013.01); *Y10T 29/49249* (2015.01)

(58) Field of Classification Search
CPC ..... B60T 13/52; B60T 13/565; B60T 13/567; F16J 1/14; B21D 7/00
USPC ................ 303/114.1, 114.3; 91/369.1, 376 R
See application file for complete search history.

(56) References Cited

U.S. PATENT DOCUMENTS

| 2,621,062 | A | * | 12/1952 | Pietzsch | 403/271 |
| 4,979,293 | A | * | 12/1990 | Horner, Jr. | 29/888.2 |
| 5,493,946 | A | * | 2/1996 | Schluter | 303/114.3 |
| 6,557,451 | B2 | * | 5/2003 | Schluter | 91/376 R |
| 7,213,436 | B2 | * | 5/2007 | Sturrus et al. | 72/377 |
| 7,357,466 | B2 | * | 4/2008 | Schluter | 303/114.1 |
| 2007/0000973 | A1 | | 1/2007 | Johnson et al. | |

FOREIGN PATENT DOCUMENTS

JP    2004189231    * 7/2004

* cited by examiner

*Primary Examiner* — Christopher Schwartz
(74) *Attorney, Agent, or Firm* — MacMillan, Sobanski & Todd, LLC

(57) ABSTRACT

An input rod for connecting a vacuum brake booster to a pedal linkage member, wherein the input rod includes a connecting portion adapted to be connected to the pedal linkage member. The input rod further including a hollow body portion formed from a stamped flat blank.

10 Claims, 9 Drawing Sheets

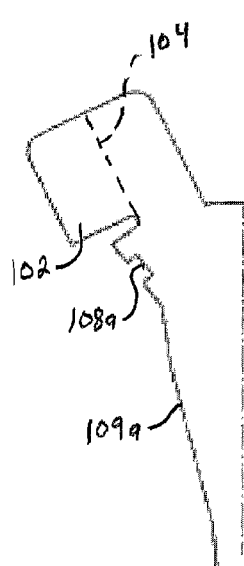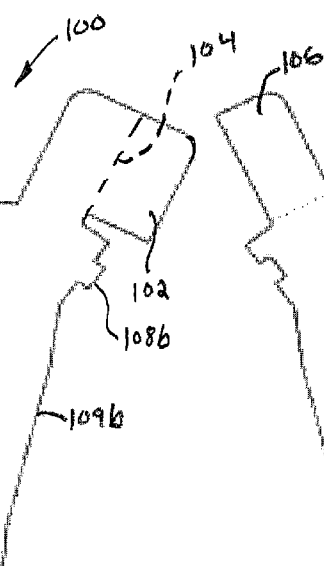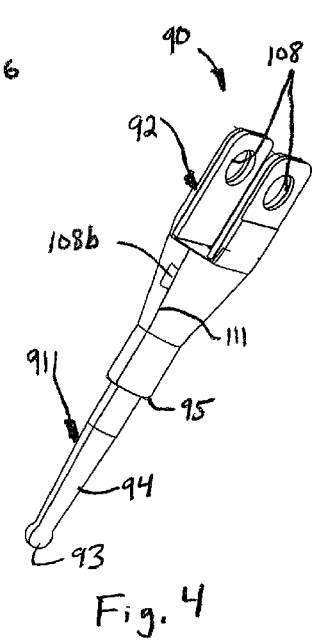
Fig. 5        Fig. 6        Fig. 4
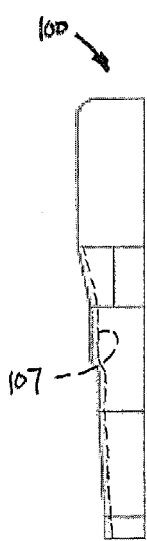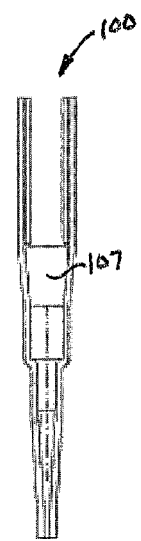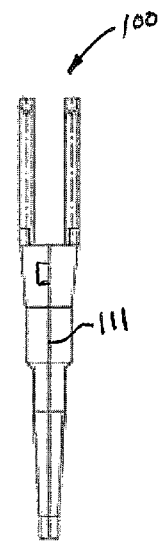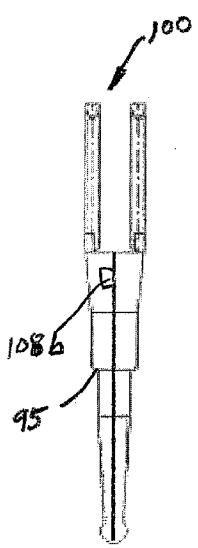
Fig. 7    Fig. 8    Fig. 9    Fig. 10    Fig. 11

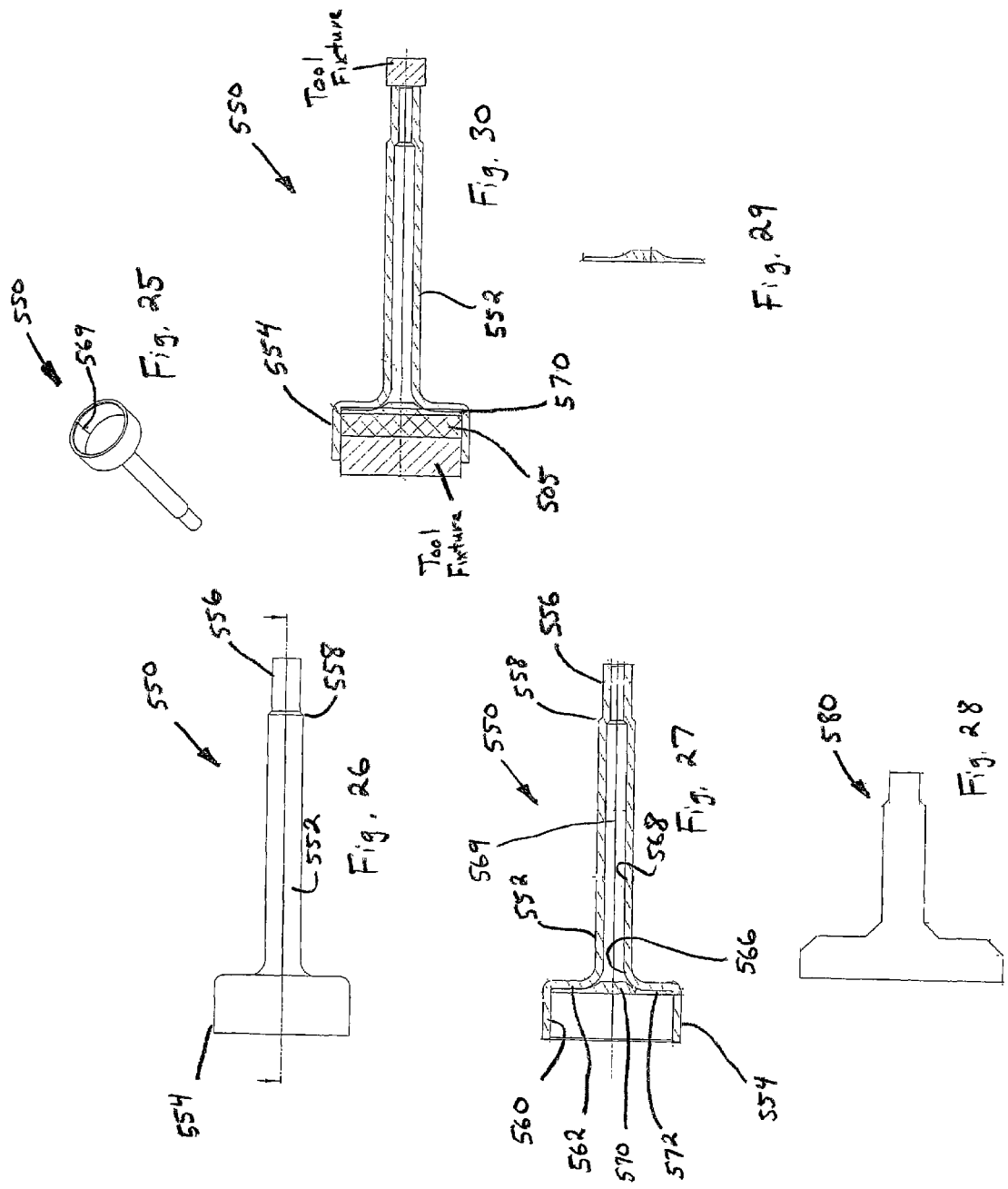

INPUT AND OUTPUT RODS FOR VACUUM BRAKE BOOSTER

CROSS-REFERENCE TO RELATED APPLICATIONS

This application claims the benefit of U.S. Provisional Application No. 61/298,408, filed Jan. 26, 2010, the disclosure of which is incorporated herein by reference.

BACKGROUND OF THE INVENTION

This invention relates in general to vehicle vacuum brake boosters, and in particular to the manufacturing of input rods and output rods for vacuum boosters.

U.S. Pat. No. 5,493,946, which is incorporated by reference herein, discloses a known vehicle vacuum brake booster. The FIGS. 1-3 are representative of drawings from U.S. Pat. No. 5,493,946 and will be used herein to describe an example of a brake booster to which an input rod, as manufactured by various methods described herein, may be used in place of a conventionally known solid input rod shown in FIGS. 1-3.

The brake booster illustrated in FIGS. 1 to 3 is substantially rotationally symmetrical with reference to an axis A which normally agrees with the longitudinal direction of the vehicle when installed in a motor vehicle. As shown in FIG. 1 the brake booster is of tandem design having a booster housing 10, a first chamber 12 and a second chamber 14, which are separated from each other by a movable wall 16, as well as a first additional chamber 12' and a second additional chamber 14', which are separated from each other by a movable wall 16'. The booster housing 10 is held together by a parallel-axis arrangement of tension rods 18, of which only one is illustrated. There is no need to detail special features resulting from the tandem design, since these are known; it being sufficient to comment that the first chamber 12 is permanently connected to the first additional chamber 12', and the second chamber 14 is permanently connected to the second additional chamber 14'.

Associated with the brake booster is a control valve 20 which is incorporated in the main in the booster housing 10 and has with reference thereto an axially movable valve body 22. In the interior of the valve body 22 an annular first valve seat 24 is formed which separates a passage 26 merging into the rear chamber 12 from a passage 28 merging into the front chamber 14. The valve body 22 has further an axial bore in which a central sleeve 29 is disposed secured to the valve body 22. In the axial bore and on the sleeve 29 a sleeve-shaped valve barrel 30 is slidingly guided along the axis A. The valve barrel 30 is composed of front and rear components which are bolted together as shown in FIG. 1. At the rear end of the rear component (shown on the right in the drawing) of the valve barrel 30 a second valve seat 32 is formed concentric to the first valve seat 24.

Spaced upstream from the second valve seat 32 (shown on the left in the drawing) the valve barrel 30 has a radial recess 34 which joins another radial recess 36 configured wider, however, in the axial direction in the valve body 22. The valve barrel 30 is permanently urged to the rear (to the right in FIGS. 1 to 3) by an axially preloaded valve spring 38. In the control valve 20 a solenoid 40 is incorporated which is assigned to the left-hand component of the valve barrel 30 as the solenoid armature such that the valve barrel 30 is drawn forwards against the resistance of the valve spring 38 when the solenoid 40 is energized.

In the central sleeve 29 a piston rod 41 of a piston 42 is guided which at its rear end is connected to the rod-shaped actuating element 44 (or input rod) and having at its front end a piston head 46. The latter forms together with a rubber element 48 embedded in the valve body 22 and a booster output member 50 arranged in front thereof, a mechanical force translation means of the usual kind in brake boosters.

The other end of the input rod or actuating element 44 is pivotally connected to a brake pedal linkage 11, schematically illustrated in FIG. 1. The linkage includes a member 11a which is pivotally connected to portion of the vehicle 11b (such as the frame or the instrument panel of the vehicle). The actuating element 44 is also pivotally connected to the member 11a at a pivot 11c. A brake pedal 11d is attached to an end of the member 11a and is depressed by the foot of the driver of the vehicle. Of course, the linkage 11 may include any number of members 11a in any suitable connecting arrangement. A force acting on the brake pedal 11d by the driver's foot is transmitting through the member 11a causing leftward movement of the actuating element 44 to actuate the brake booster and associated master cylinder (not shown). The end 44a of the actuating element (or input rods a described below) may have a spherical shape and be received in a socket 42a of the piston 42 for a pivoting connection to accommodate slight vertical and/or lateral movement of the actuating element 44 as the actuating element 44 is moved longitudinally (leftward) during actuation.

The actuating element 44 (input rod) generally includes a forward end (left-hand end as viewing FIG. 1) which is generally cylindrical or annular in shape. The actuating member 44 includes a shoulder 44b formed therein for providing a stop for a spring 58. The other end (right-hand end as viewing FIG. 1) of the actuating element 44 includes a yoke structure for pivotally connecting to the brake pedal linkage member 11a. The yoke structure includes a pair of laterally spaced flanges 44c. This arrangement is referred to as a clevis-type design. The yoke structure of the actuating element 44 includes openings 44d formed therein to receive a pivot pin (not shown) pivotally connected the member 11a to the actuating member 44.

In an annual groove of the piston 42 a stopper element 52 is latched in such a way that it is connected to the piston for common axial movement. The stopper element 52 extends radially outwards through the recesses 34 and 36 in the valve barrel 30 and valve body 22 respectively and in the illustrated rest position of the piston 42 is in contact with a stopper 53 which is formed on a shoulder of the booster housing 10 and is thus independent of the position of the valve body 22.

Spaced away from the rear of the stopper element 52 a flange-like coupling element 54 is formed which in the illustrated rest position of the piston 42 and of the valve barrel 30 is in contact with an annular abutment 55 formed on the valve barrel. The valve spring 38, resulting in this contact, is totally disposed within the valve barrel 30 and tensioned between the second valve seat 32 and the piston 42.

Radially outwards from the abutment 55 an annular seal 56 is disposed, located in an annular recess 57 formed open to the rear end in the piston 42 and which in the illustrated rest position seals off the coupling element 54 of the piston 42. The effective diameter of the seal 56 is, as shown in FIGS. 1 to 3, slightly smaller than the effective diameter of the second valve seat 32. The region downstream of the seal 56 (on the right in the drawing) is continuously exposed to atmospheric pressure. In the illustrated rest position of the valve barrel 30 the seal 56 prevents the atmosphere from gaining access to the rear chamber 12 via the valve barrel 30 and the recesses 34 and 36.

By means of a rear return spring 58 the actuator element 44 (input rod) is normally maintained in its illustrated rest position in which an annular sealing element 60 disposed within the valve body 22 in the usual way and pretensioned forwardly by a spring 62 has sealing contact with the first valve seat 24, while not providing a total seal of the second valve seat 32, a slight difference in pressure existing between the two chambers 12 and 14. In operation the front chamber 14 is permanently connected to a vacuum source, as a result of which a vacuum exists in both chambers 12 and 14 in the rest position of the valve barrel 30. The moving wall 16 and the valve body 22 connected thereto in common axial movement thereof are urged into their rear final position, as shown, by a front return spring 64.

In idle condition the stopper element 52 is in contact with the stop 53, thereby defining the rest position of the piston 42. The valve barrel 30 is supported by the coupling member 54 with practically all of the force exerted by the valve spring 38 clamped between the valve barrel and the piston 42, thereby also defining the rest position of the valve barrel 30, the second valve seat 32 being maintained in contact with the sealing element 60 by a slight residual force of the valve spring 38.

On forward displacement of the actuator element 44 via the pedal linkage 11, which for instance is connected to the brake pedal of a vehicle, thus producing forward displacement of the piston 42, the coupling member 54 thereof includes displacement of the abutment 55 and thus of the valve barrel 30 as a whole so that its valve seat 32 is released from the sealing element 60, allowing the downstream flow of atmosphere into the valve body 22 to access the rear chamber 12 through the passage 26 and further through the radial recess 36 in the valve body 22. The front chamber 14 is separated from the rear chamber 12, since the sealing element 60 is maintained firmly in contact with the first valve seat 24, thereby resulting in a difference in pressure between the two chambers 12 and 14 which causes the movable wall 16 together with the valve body 22 and the booster output member 50 to be displaced forwardly. The booster output member 50 transfers the force acting on it to a brake master cylinder 66, the rear end area of which is illustrated in FIG. 1.

If the forward movement of the valve barrel 30, affected mechanically via the piston 42, and the attendant booster output to the brake master cylinder 66 need to be accelerated and amplified, the solenoid 40 is energized so that it draws the valve barrel 30 away from the coupling element 54 forwards, thereby increasing the clear flow cross-section between the second valve seat 32 and the sealing element 60. Such a boosted output of the brake booster may for instance be desirable when the vehicle being decelerated is heavily loaded or when particularly fast forward movement of the actuator element 44 indicates that braking action is wanted on an emergency.

In these instances the solenoid 40 receives current via a controller with which an acceleration sensor monitoring the actuator element 44 is associated. Instead of this or additionally the power supply of the solenoid 40 may be controlled by a distance sensor which triggers braking action without the driver of the motor vehicle being involved, when the distance away of a vehicle driving ahead violates a specific minimum. In the latter case the control causes, via the solenoid 40, to be moved forward, thus allowing an inflow of atmosphere into the first chamber, even in the absence of a mechanical actuation, i.e. the piston 42 remaining in its rest position.

In any case, on de-energization of the solenoid 40 the valve barrel 30 is again urged rearwards by the valve spring 38 so that the abutment 55 is returned in contact with the coupling element 54 and the seal 56 is again effective. On completion of a mechanical force input via the actuator element 44 the piston 42 together with the valve barrel 30 returns to the rest position. The movable wall 16 and the valve body 22 fail to be involved in this return movement as long as a difference in pressure exists between the chambers 12 and 14. This difference in pressure is depleted by the valve barrel 30 urging the sealing element 60 a short distance to the rear so that it unseats from the first valve seat 24.

Previously known input rods, such as the actuator element 44 shown in FIGS. 1-3, generally include a body portion 44' and a connecting portion 44". The body portion 44' is generally elongate and is disposed in the vacuum booster. The body portion 44' has an annular shape and is formed from a solid stock of material, and more particularly, a solid round bar. The bar is formed and machined, such on a lathe or other cutting tool, to form the annular shape. The machining operation forms the spherical end 44a and a tapered portion 44e extending rearwardly from the spherical end 44a. The body portion 44' also includes a shoulder 44d formed therein which may function as spring stops. The connecting portion 44" includes features for pivotally connecting the actuator element 44 to the pedal linkage 11. The connecting portion may be in the form of a clevis-type design, such as shown in FIG. 1, having a pair of spaced apart flanges 44c. Other known connecting portions include a paddle style in which a single flattened plate shaped end (instead of two flanges 44c) is used to provide a connection to the pedal linkage 11.

SUMMARY OF THE INVENTION

This invention relates to actuating elements, such as input rods and output rods, for vacuum boosters. One embodiment of the invention includes an input rod for connecting a vacuum brake booster to a pedal linkage member, wherein the input rod includes a connecting portion and a hollow body portion formed from a stamped flat blank. Instead of machining the body portion of the input rod as described above in the background of the invention, the body portion of the actuating elements of the present invention are hollow and may be formed from a generally flat blank which is rolled formed into a tubular work piece via various stamping operations. The connecting portion of the actuating elements may also be formed during such stamping operations.

Another aspect of the invention is a method of manufacturing a rod for a vacuum brake booster which includes the step of providing a flat blank having opposed edges. At least a portion of the blank is then formed into a tubular structure such that the opposed edges are adjacent one another to define a seam. The seam may be welded together is so desired.

Various aspects of this invention will become apparent to those skilled in the art from the following detailed description of the preferred embodiments, when read in light of the accompanying drawings.

BRIEF DESCRIPTION OF THE DRAWINGS

FIG. 4 is a schematic perspective view of a first embodiment of an input rod made in accordance with the present invention.

FIG. 5 is a schematic front elevational view of a blank that may be used in forming the input rod of FIG. 4.

FIG. 6 is a schematic front elevational view of the blank illustrating a forming operation to fold the devises of the blank of FIG. 5.

FIG. 7 is a schematic side elevational view of the blank illustrating a further forming operation of the blank of FIG. 6.

FIG. 8 is a schematic front elevational view of the blank of FIG. 7.

FIG. 9 is a schematic front elevational view of the blank illustrated in FIGS. 7 and 8 illustrating a further forming operation in which the blank is closed up.

FIG. 10 is a schematic front elevational view of the blank of FIG. 9 illustrating a further forming operation in which a spherical tip is cold formed.

FIG. 11 is a schematic front elevational view of the blank of FIG. 10 illustrating a further forming operation in which a shoulder is coined.

FIG. 25 is a perspective view of a first embodiment of an output rod made in accordance with the present invention.

FIG. 26 is a top plan view of the output rod of FIG. 25.

FIG. 27 is a side cross-sectional view of the output rod of FIG. 25.

FIG. 28 is a top plan view of a blank which maybe used to form the output rod of FIG. 25.

FIG. 29 is a cross-sectional view of a disk used with the output rod of FIG. 25.

FIG. 30 is a cross-sectional view of the output rod of FIG. 25 shown in a testing rig having tool fixtures to provide a load on the output rod.

DETAILED DESCRIPTION OF THE PREFERRED EMBODIMENTS

Figure 1:
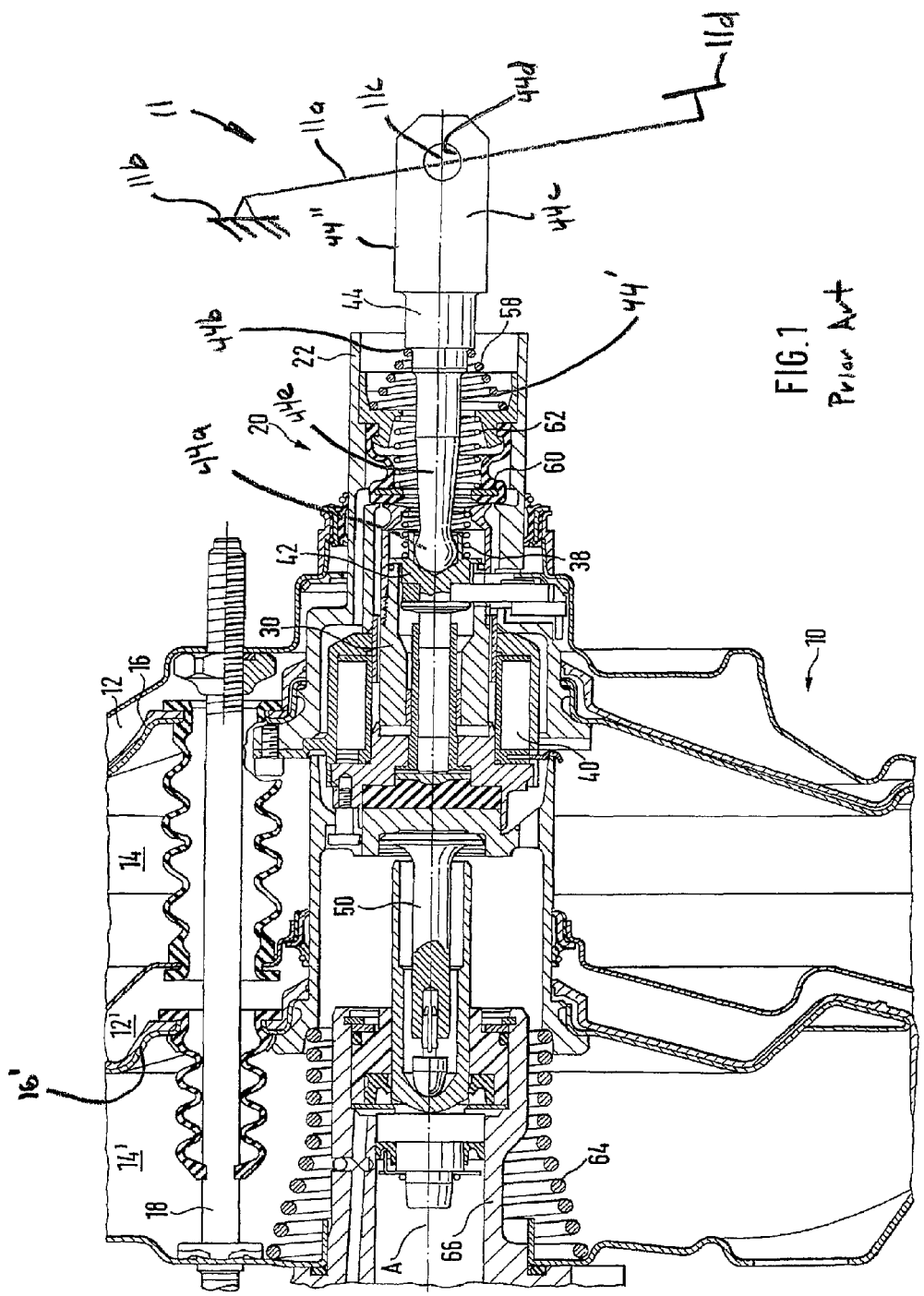
FIG. 1 is a partial cross-sectional view of a prior art vacuum brake booster including a conventional input rod.

As will be described in further detail below, the actuating elements of the present invention have hollow body portions which may be formed from a generally flat blank which is rolled formed into a tubular work piece via various stamping operations. This is in comparison to conventionally known actuating elements which have body portions that are formed from solid stock that are machined to size on a lathe or other cutting tool. A method of manufacturing a tubular work piece is described in U.S. Patent Application Publication 2007/0000973, which is hereby incorporated by reference herein. Following an initial formation of the hollow body portion of the actuating element, the work piece is preferably subjected to one or more re-striking steps wherein the tubular work piece is essentially compacted, forcing the edges of the work piece together to form a substantially tight seam. These stamping operations may be performed by a series of progressive dies. A sequence of punching, drawing, cutting, or other operations are performed on a continuous sheet of metal as the sheet progresses through the sequence of tools arranged on a machine. Various operations progressively alter the original flat sheet of material until a finished part or work piece is formed and may be separated from the sheet material by a final cut off die at the end of the progression. A progressive die system (not shown) may move the work piece from station-to-station by way of a carrier strip, carrier ribbon, or strip skeleton typically formed along the edges of the metal sheet to provide a structural bridge between the parts as the parts are progressively formed along the sequence of dies.

There is illustrated in FIG. 4 a schematic perspective view of an input rod 90. The input rod 90 may, for example, be used in place of the conventionally known actuating element 44 of the vacuum booster as shown and described with respect to FIGS. 1-3. The input rod 90 generally includes a body portion 91 and a connecting portion 92. The body portion 91 is generally hollow and includes a spherical end 93, a tapered portion 94, and a shoulder 95.

The input rod 90 may be formed from a flat blank 100 illustrated in FIG. 5. The blank 100 may be made of any suitable material such as steel. The blank 100 may have a constant thickness. Thus, the blank 100 can be formed from a sheet of material which is punched to the shape as shown in FIG. 5. Optionally, a pair of wing portions 102 may be folded over at a folding line 104 to form clevis flanges 106 as shown in FIG. 7. The flanges 106 have double the thickness than the thickness of the original blank 100. This double thickness increases the strength of the clevis flanges 106 and also provides for a greater thickness when connecting to a respective pedal linkage member.

The blank 100 may be formed with a mechanical lock feature which assists in retaining the blank 100 in its formed state. A mechanical lock feature is any integral or separate locking structure that cooperates to help prevent separation of the adjacent edges of the body portion 109a and 109b. For example, as illustrated in FIG. 5, the blank 100 includes one or more square or trapezoidal recess 108a and tab 108b. The recess 108a and tab 108b are formed in edges 109a and 109b, respectively, of the blank 100. The recess 108a and tab 108b are configured to interlock the edges 109a and 109b during the forming process, thereby forming a mechanical lock to help prevent separation of the abutting edges 109a and 109b of the blank 100. Thus, the tab 108b will interlock into the recess 108a, as shown in FIG. 4 to provide a more rigid connection.

The blank 100 is preferably stamped from a flat stock into an annular form by various preform configurations as shown in FIGS. 7 through 11. A first preform operation initiates a bending of the flat stock or blank 100 by drawing the flat stock into a trough shape having a semi-cylindrical cavity 107 of a predetermined radius. Thus, the body portion 91 has a generally U-shaped configuration as this point, as shown in FIGS. 7 and 8. The predetermined radius is defined within a die portion of a tool used to perform the performing operation. Such an example of this forming step is disclosed and described at FIG. 2 with respect to station 18 of U.S. Patent Application Publication 2007/0000973. Of course, the hollow or tubular input rod 90 bay be formed any other suitable forming operation other than that described in U.S. Patent Application Publication 2007/0000973. Optionally, a second station may further define the profile to further impart a tighter curl to the blank 100. In these preforming operations, other features, such as the shoulder 95, the tapered portion 94, and other shapes and features can be formed with the tool and dies used during these performing operations.

Next, an additional preforming operation can be carried out to close off the tubular body portion 91. Such an example of this step is disclosed and described at FIG. 2 with respect to station 22 of U.S. Patent Application Publication 2007/0000973. During this operation, a punch cavity of the tool rolls the edges or legs of the U-shaped work piece inwardly toward one another until they are approximately in contact with one another. A subsequent step (such as described with station 24) uses a rather straight forward punch cavity and a die cavity working in combination with each other to produce a cavity substantially conforming to the outside dimension of the body portion 91, such as shown in FIG. 9 of the present invention. This forming step, referred to as a re-striking operation, compresses and compacts the work piece to substantially close a seam 111 defined by the meeting of the opposing edges 109a and 109b of the blank 100. Preferably, the opposing end faces of the blank edges 109a and 109b are urged forcing them together such that any gap therebetween is barely perceptible to the eye. One or more stations may be used to perform the re-striking operation.

In a preferred method, the diameter and overall shape of the cavities formed in each of the respective station is just slightly larger than the finished shape and dimension of the final product. Each successive station will preferably provide a progressively smaller cavity to achieve the desired result. This is particularly true for the final stations where the work piece is subjected to re-striking which imparts the final close seam and wall thickness tolerances characteristic to the work piece. As each station becomes progressively smaller, the overall shape of the work product becomes more compact. That is to say that with each stroke of the die assembly, the exterior surface of the work piece receives a force substantially perpendicular or normal to its surface. Because of the tubular structure, and acting much like a keystone works in an arch, the perpendicular force is transferred to the edges adjacent thereto, causing opposing forces about the tubular structure. As the force is increased, any deformation in the blank occurs in the walls, producing an increase in the overall wall thickness. This annular redistribution of pressure produced by the re-striking step also results in the butt ends of the edges of the blank, now in contact with one another, to conform closely to one another, forming a substantially close fitting seam 111.

Preferably, a next forming operation includes cold forming the spherical end 93 into its spherical shape, as shown in FIG. 10. The cold forming operation can be formed by any suitable tool and die operation, such as forcing the free end of the body portion 91 into a generally spherical die cavity. The cold forming of the spherical end 93 may include one or more operations or stations.

If desired, the shoulder 95 can be coined with a suitable coining operation to more accurately form the shoulder 95. Although the embodiment of the input rod 90 illustrates a single shoulder 95 it should be understood that any number of shoulders can be formed in the input rod 90.

The seam 111 may be welded to provide extra strength for the input rod 91 and help prevent the seam 111 from spreading or opening The seam 111 may be welded along its entire length or just portions of the seam 111. The seam 111 may be welded by any suitable welding operation, such as by plasma welding.

As discussed above, the blank 100 may include mechanical lock features to help urge the seam to be closed tightly and remain that way throughout the life of the input rod 90. One such method contemplated for achieving that task is with the aid of shallow inverted trapezoidal shaped recess 108a and tab 108b formed in the edge 109a and 109b of the blank 100. The blank 100 is configured such that when the edges 109a and 109b come together, the tab 108b is received within the recess 108a, much like a dovetail joint works in joining two pieces of wood in furniture. However in this instance, the degree of angle imparted to the scalloped edges may be shallow, and the depth or length of each is slightly longer for reasons that will become apparent below. When the recess 108a and tab 108b are initially brought into contact with one another, the tab 108b is received within the recess 108a as the two edges 109a and 109b translate toward one another. The tolerances between adjoining structures provide for some area of expansion. When the blank is subjected to the re-striking process, and the overall tubular structure is compacted, the respective structures defined along the edges are forced against each other, causing each to spread laterally and fully occupy the gap between the adjacent structure, causing the trapezoidal tab 108b to interlock with the trapezoidal recess 108a so that they cannot be withdrawn in the same direction in which they were joined. Other interlocking geometric shapes and structures can also be used in place of the inverted trapezoids, such as fingers, crescents, and the like.

It is noted that the wing portions 102 of the blank 100 (and ultimately the clevis flanges 106) do not form the tubular body portion 91 but instead extend outwardly from an end of the body portion 91 and define a portion of the connecting portion 92. In one of the final operations for forming the input rod 90, openings 108 may be formed in the flanges 106 such as by a piercing operation. Of course, the openings 108 may be formed during the formation of the blank 100 or can be pierced at any point during the formation of the input rod 90. The openings 108 provide means for pivotally attaching the input rod 90 to the pedal linkage 11.

An advantage of the method of manufacturing the input rod 90 as described above is that a light weight, yet rigid structural element can be manufactured at a reduced cost compared to input rods which are made from solid stock bar and then machined to their final dimensions. To increase the strength of the tubular body portion 91 without substantially increasing the weight, the interior of the tubular body portion 91 may be filled with a polymer material. For example, acceptable materials may be in the form of closed-cell polystyrene, open-cell polystyrene, polyethylene, urethane or polyurethane having a density within the range of 4 pounds to 25 pounds. Additional polymer materials may also be used. If greater rigidity and strength is preferred, thermoplastics, thermosetting polymers, or hydrophilic and other two component polymeric materials may be used to fill the tubular cavity. These fillers may provide rigid and dense filler that makes the wall of the work pierce virtually impervious to crimping or failure under normal use. These types of fillers often provide very strong adhesion and could be used to provide a mounting surface or substrate for hardware used to mount the work piece to a second substrate such as an appliance.

The polymers described above may be placed in the tubular body portion 91 in a number of ways, including pouring in situ, injection, and spraying. In one embodiment, the polymer may be injected into the cavity of the body portion 91. Alternatively, a preformed polymer filling may be inserted into the tubular cavity prior to the final stamping step closing the tubular structure. It is also contemplated that any filler such as those described above need not be used to fill the entire tubular cavity.

Figure 13:
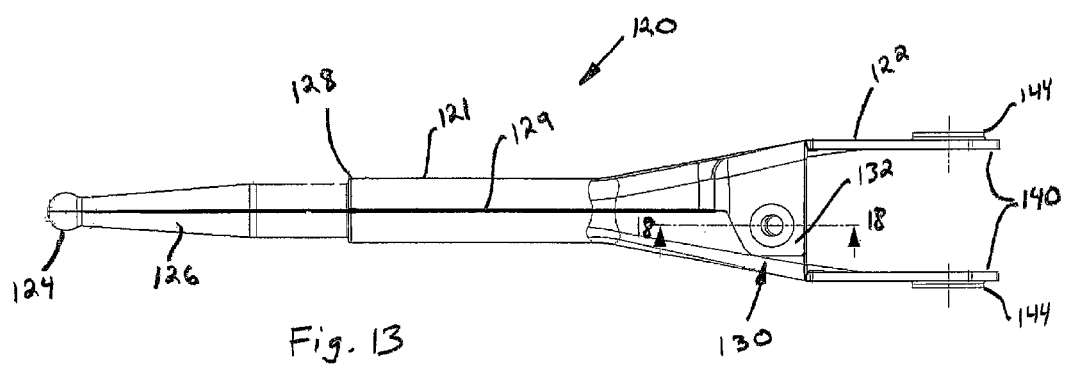
FIG. 13 is a front elevational view of the input rod of FIG. 12.
Figure 14:
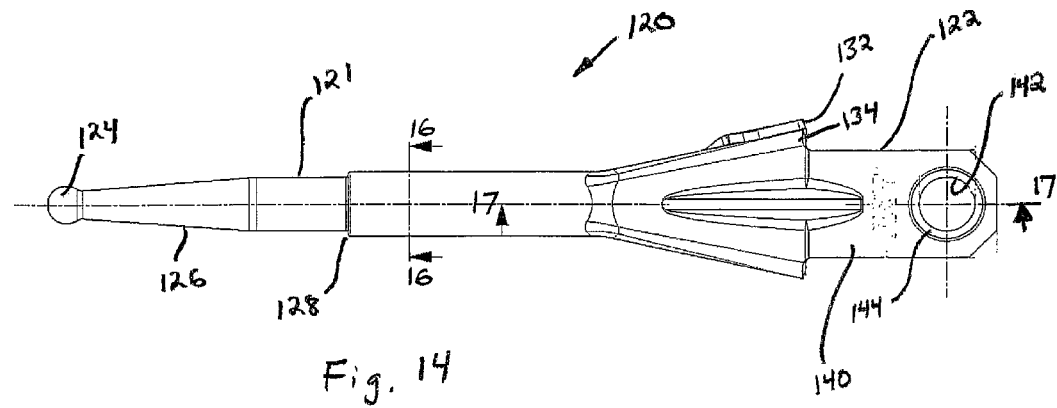
FIG. 14 is a side elevational view of the input rod of FIG. 12.
Figure 18:
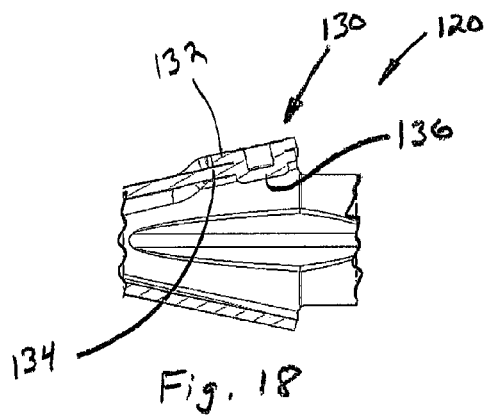
FIG. 18 is a cross-sectional view of a portion of the input rod taken along lines 18-18 in FIG. 13.
Figure 15:
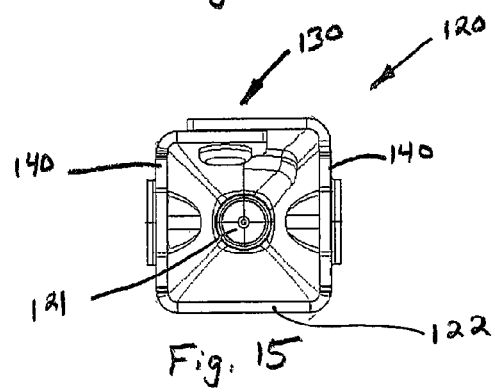
FIG. 15 is an end elevational view of the input rod of FIG. 12.
Figure 16:
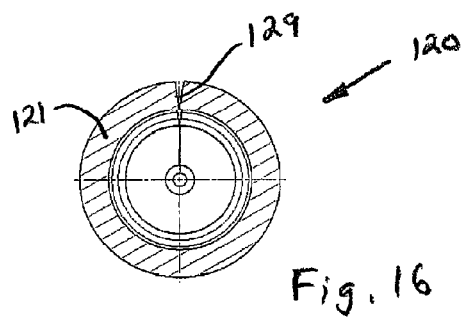
FIG. 16 is a cross-sectional view of the input rod taken along lines 16-16 in FIG. 14.
Figure 17:
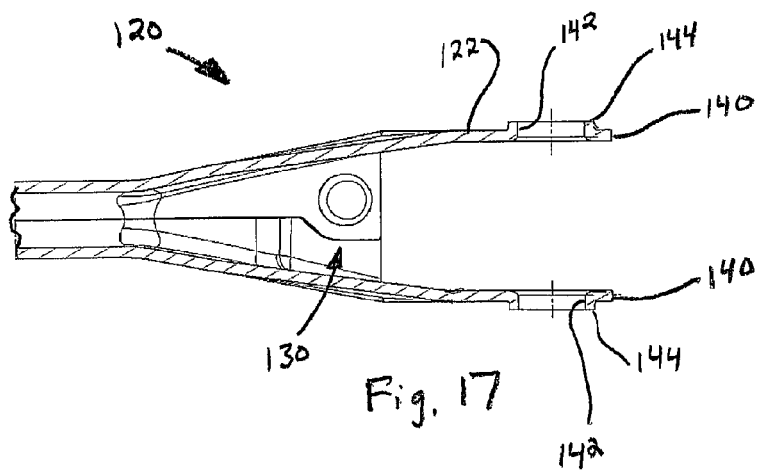
FIG. 17 is a cross-sectional view of a portion of the input rod taken along lines 17-17 in FIG. 14.

There is illustrated in FIGS. 12 through 18 a second embodiment of an input rod, indicated generally at 120. The input rod 90 is similar in structure and function to the input rod 90 described above and is preferably formed from a flat blank (not shown) and may be used in place of the conventionally known actuating element 44 of the vacuum booster as shown and described with respect to FIGS. 1-3. The input rod 120 generally includes a body portion 121 and a connecting portion 122. The body portion 120 is generally hollow, as shown in FIG. 16. The body portion 121 includes a spherical end 124, a tapered portion 126, a shoulder 128, and a seam 129. One of the differences between the input rods 90 and 120 is the mechanical lock features. The input rod 120 utilizes a "toggle-lock" style mechanical lock feature, indicated generally at 130. As shown in FIGS. 13 and 18, the input rod 120 includes an overlap flange 132 which overlaps a receiving portion 134 of the input rod 120. A button or protrusion portion 136 of the overlap flange 132 is forced into the receiving portion 134. The receiving portion 134 may or may not include a hole or aperture for receiving the protrusion portion 136. The protrusion portion 136 may be punched or otherwise formed into the receiving portion 134. The protrusion portion 136 may be formed with any particular shape to help retain the protrusion portion 136 within the receiving portion 134.

Similar to the input rod 90, the input rod 120 includes clevis flanges 140. The clevis flanges 140 are formed form a single layer of the blank as compared to the clevis flanges 106 of the input rod 90. The clevis flanges 140 include apertures 142 formed therein. If desired, the clevis flanges 140 may include raised tubular portions 144 adjacent the apertures 142 to provide increased strength and to form a desired thickness at the connection point for a pedal linkage member (not shown).

Figure 19:
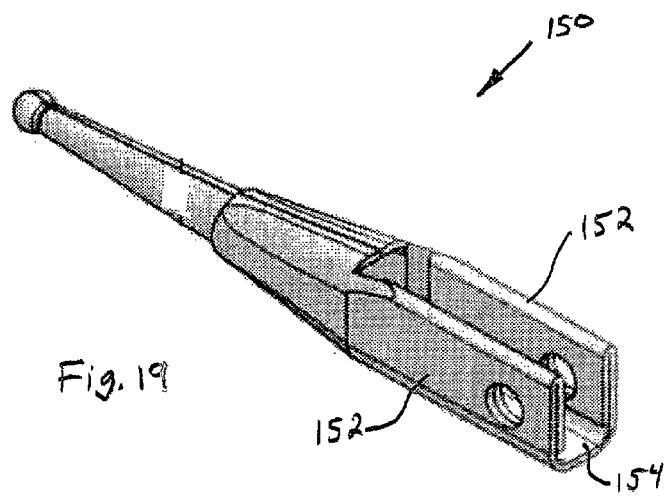
FIG. 19 is a perspective view of a third embodiment of an input rod.
Figure 20:
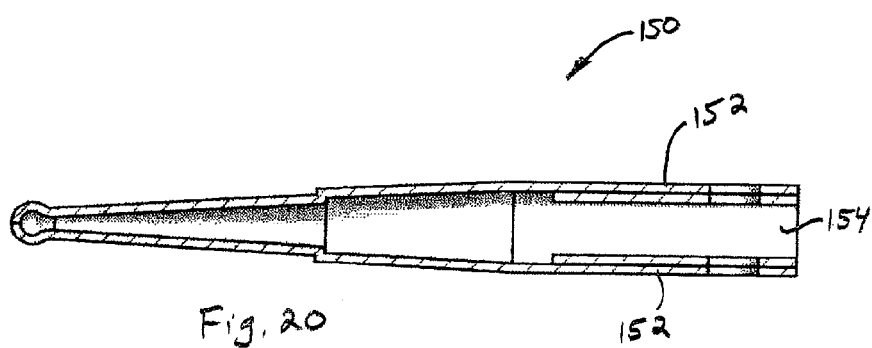
FIG. 20 is a cross-sectional view of the input rod of FIG. 19.

There is illustrated in FIGS. 19 and 20 a third embodiment of an input rod, indicated generally at 150. The input rod 150 is similar to the input rods 90 and 120 and is formed from a single blank. The input rod 150 is a clevis-type design. However, the input rod 150 includes a pair of clevis flanges 152 which are connected together by a web 154. The input rod 150 may be formed from a similar stamping operation as that used to form the input rods 90 and 120. The input rod 150 may be formed such that the flanges 152 have double wall thickness. The web 154 may have a single thickness as shown, or may be configured to have a double thickness.

Figure 21:
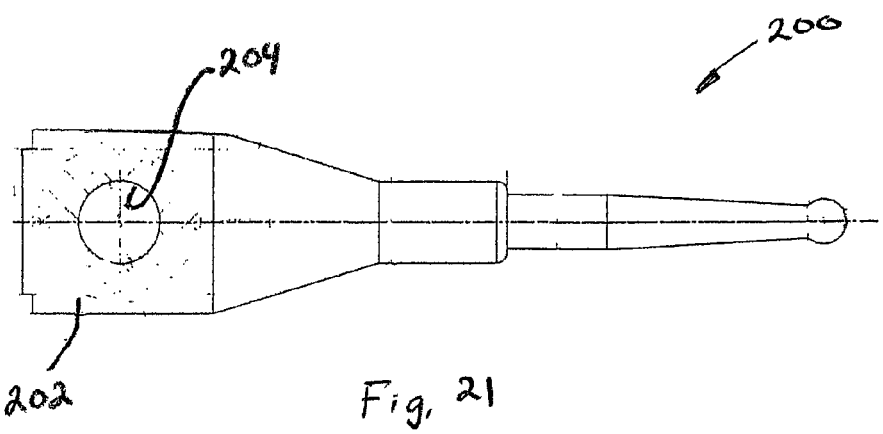
FIG. 21 is an elevational view of a fourth embodiment of an input rod.
Figure 22:
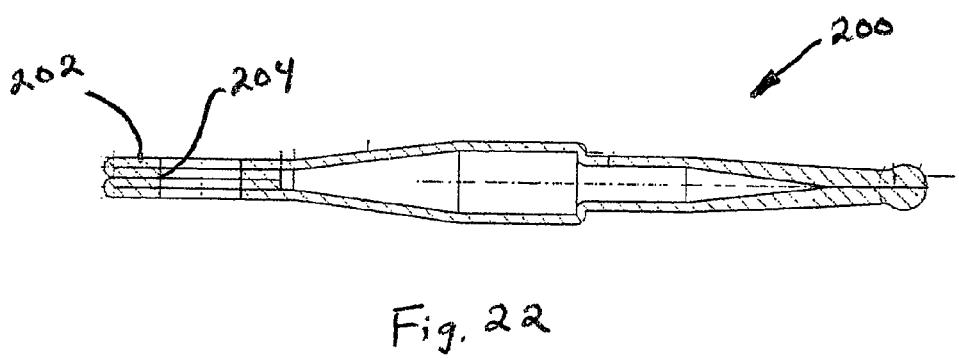
FIG. 22 is a cross-sectional view of the input rod taken along lines 22-22 in FIG. 21.
Figure 23:
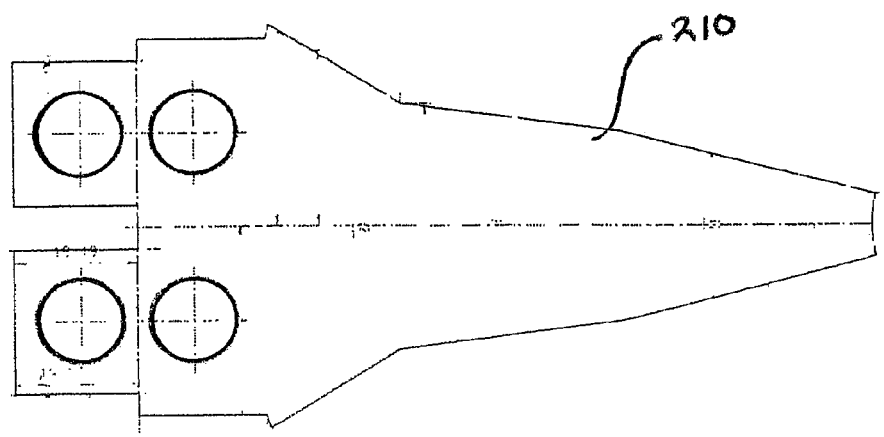
FIG. 23 is a front elevational view of a blank which may be used to form the input rod of FIG. 21.

There is illustrated in FIGS. 21 and 22 a fourth embodiment of an input rod, indicated generally at 200 which is similar in function as the input rods described above but includes a flat paddle-type connecting portion 202 instead of a clevis-type design. The paddle-type connecting portion 202 can be a flat plate like configuration designed to be pivotally attached to a clevis-type portion of a pedal linkage member (not shown). The connecting portion 202 may have multiple thicknesses formed from folding two or more blank portions together. In the illustrated embodiment of FIG. 22, the connecting portion 202 has a quadruple thickness. The connecting portion 202 may also include an opening 204 formed therethrough for receiving a pivot pin or member for connecting to the pedal linkage. There is illustrated in FIG. 23 a blank 210 which may be used for forming the input rod 200 of FIGS. 21 and 22.

It should be understood that an input rod in accordance with the present invention could be made with a connecting portion which is separate from the tubular body portion as described above. Thus, a clevis-type or paddle type connecting portion could be attached, such as by welding, adhesive, or fastener, to a tubular body portion which is formed from the stamping operating described above. Alternatively, the input rod may have a different connecting portion other than the clevis or paddle-type.

Figure 24:
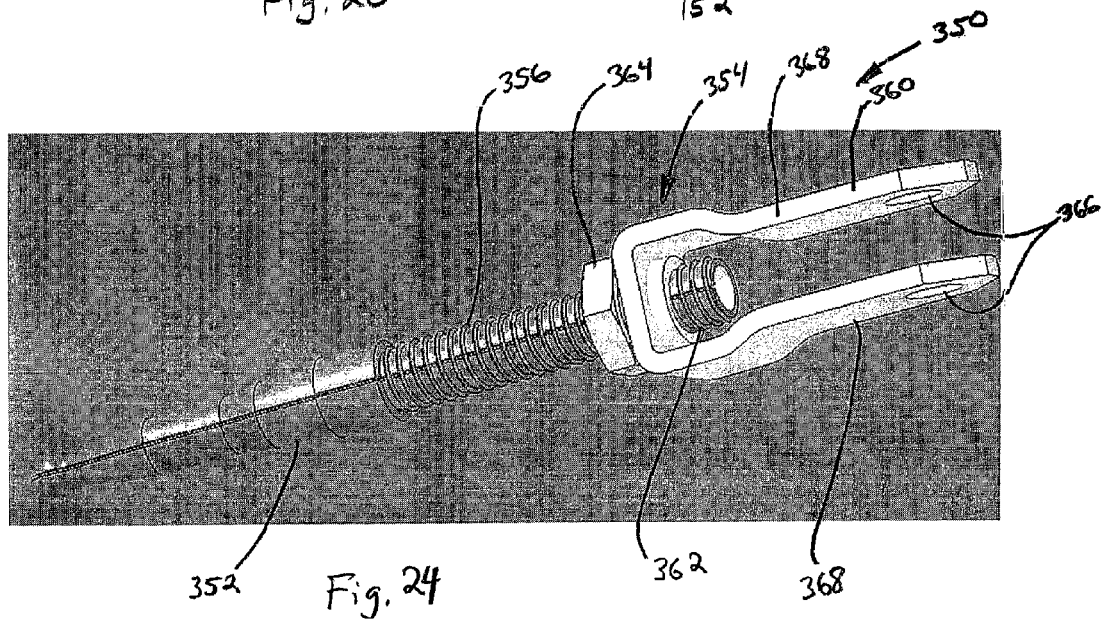
FIG. 24 is a perspective view of a fifth embodiment of an input rod.

There is illustrated in FIG. 24 a fifth embodiment of an input rod 350. The input rod 350 includes a body portion 352 and a connecting portion 354. The body portion 352 includes a tubular threaded portion 356 integrally formed with the body portion 352. Thus, the body portion 352 and the tubular threaded portion 356 may be formed by a stamping operation using a flat blank as described above. The threads may be formed by being stamped from a die, a rolling operation, cut therein, or any other suitable method. The connecting portion 354 further includes a separate U-shaped clevis 360. The clevis 360 includes a threaded bore 362 which is threaded onto the tubular threaded portion 356. One or more threaded lock nuts 364 may also be used to further secure and retain the clevis 360 onto the threaded tubular portion 356. The clevis 360 may include openings 366 formed in a pair of flanges 368 to provide a pivoting connection to the pedal linkage 11.

Figure 2:
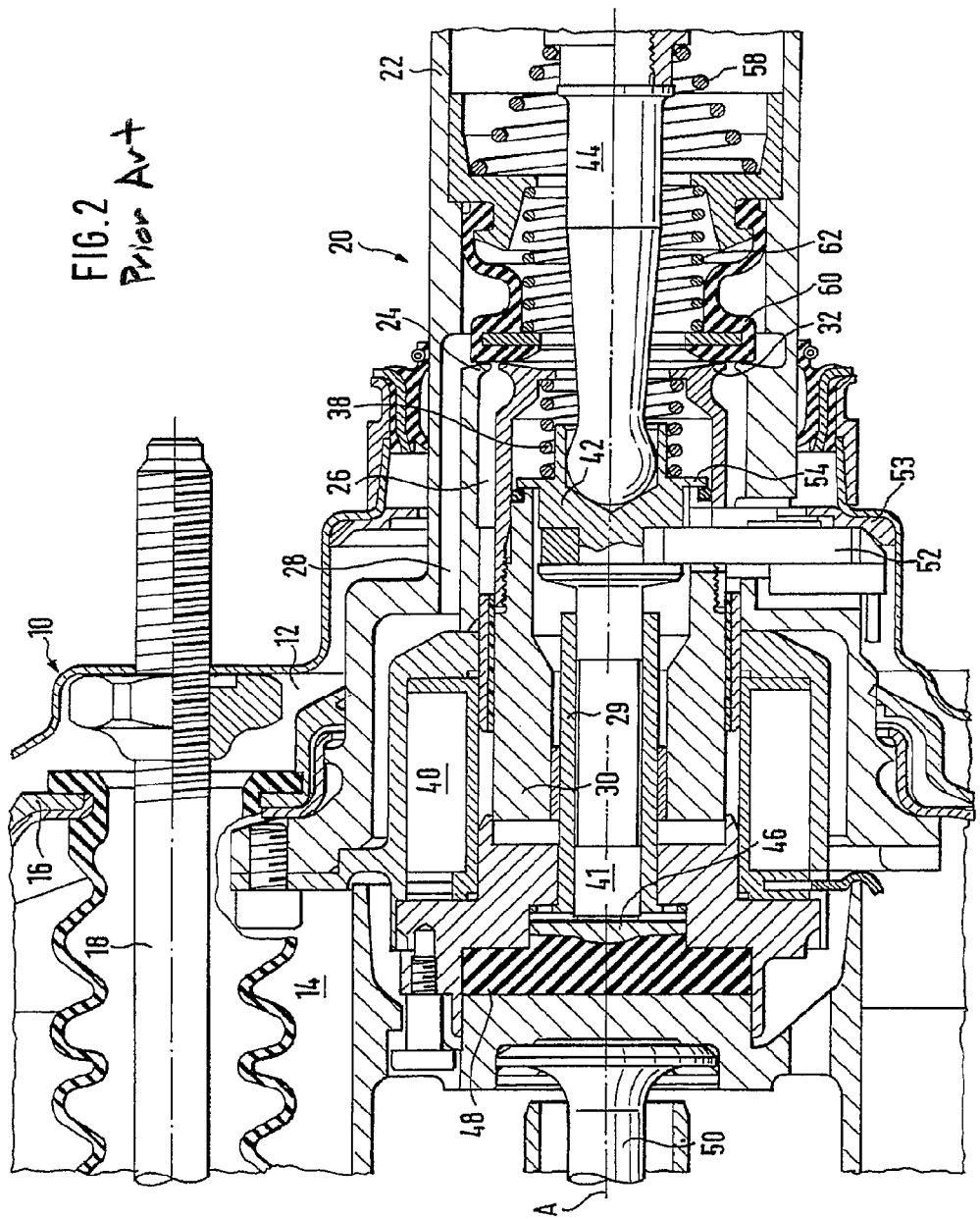
FIG. 2 is an enlarged partial cross-sectional view of a portion of the prior art vacuum brake booster of FIG. 1.
Figure 3:
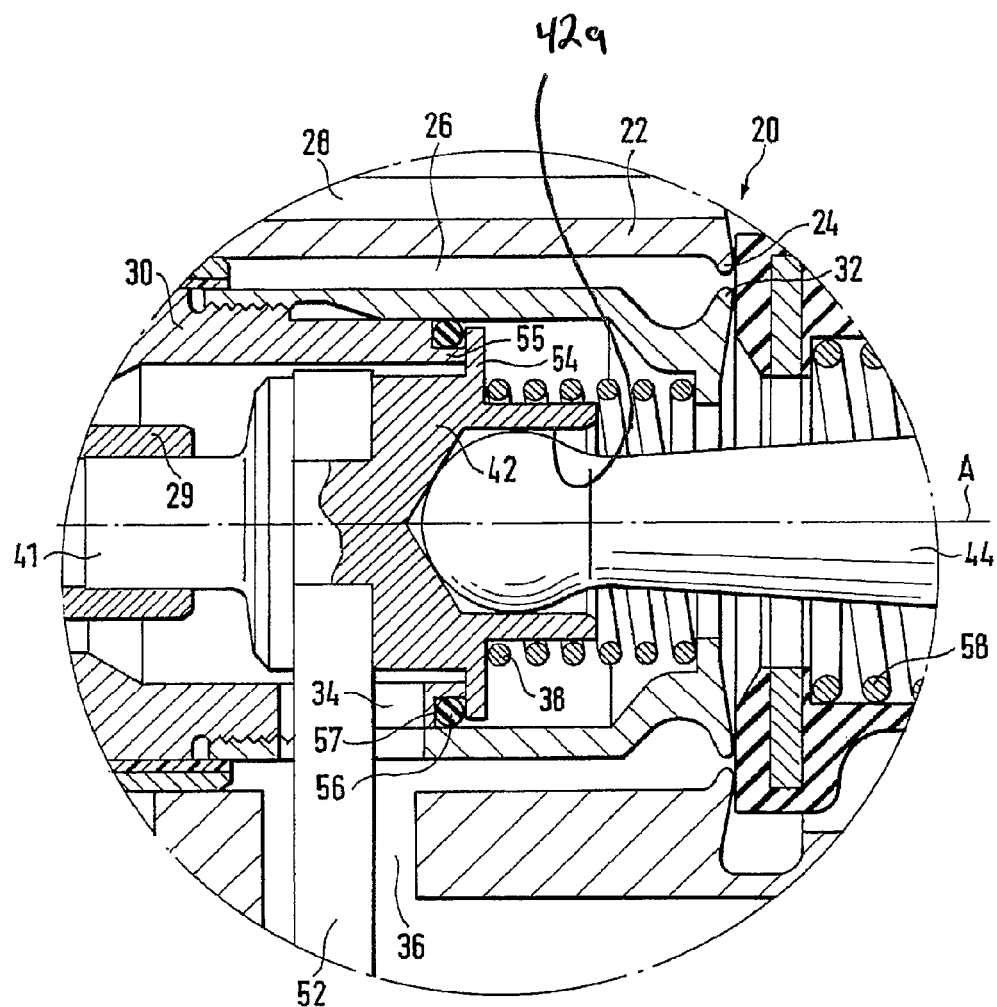
FIG. 3 is an enlarged partial cross-sectional view of a portion of the prior art vacuum brake booster of FIG. 2.
Figure 12:
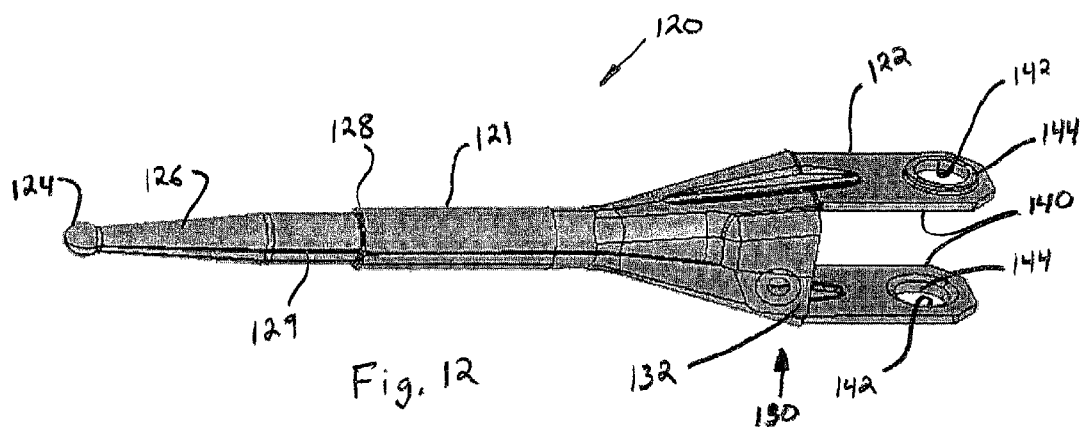
FIG. 12 is a perspective view of a second embodiment of an input rod.

There is illustrated in FIGS. 25 through 27 an output rod 550 which may be used in place of the output rod 50 of the vacuum booster illustrated in FIGS. 1-3. The output rod 550 connects between the control valve assembly of the vacuum brake booster 10 and a piston of a master cylinder (not shown). The output rod 550 generally includes an elongated tubular stem 552 and a cup-shaped enlarged end 554. The stem 552 may include a reduced diameter end 556 defining a shoulder 558. The end 556 and shoulder 558 may be configured to provide a mating connection for corresponding components of the piston and/or other components of the master cylinder. Alternatively, the stem 552 may not include the reduced diameter end 556 and instead have a continuous cross-section throughout. A socket (not shown) or some other component may be formed or attached to the end 556 for connecting to the master cylinder. The enlarged end 554 is generally in the form or a tubular cylinder including an outer cylindrical wall 560 and a floor 562. The floor 562 may include an opening 566 which communicates with a passageway 568 through the stem 552. Optionally, the output rod 550 may include a circular disk 570 disposed on the floor 562 to provide a relatively flat planar surface 572 for engagement with an elastomeric reaction disk 48 of the vacuum brake booster 10. The purpose and use of a dampening reaction disk (or rubber element 48) is well known in the art of vacuum brake boosters. The inclusion of the circular disk 570 blocks the opening 566 and prevents extrusion of the elastomeric reaction disk through the opening 566 had the circular disk not have been included. The circular disk 570 can be a simple flat plate, or may have a contoured surface(s) as shown in FIGS. 68, 70 and 71. A seam 569 extends along the length of both the stem 552 and the enlarged end 554 and may be welded together if so desired. Alternatively or in addition to, the blank may include mechanical locking features, such as those discussed above with respect to various input rods.

There is illustrated in FIG. 69 a blank 580 which may be used to form the output rod 550. Similar to the input rods described above, the output rod 550 may be formed in a sequence of steps that roll the flat blank 580 into a tubular or annular part in the form of the output rod 550.

It should also be understood that other manufacturing steps other than those described above may be used on the input rods and the output rods. For example, the input and output rods may undergo polishing, tumbling, flashing removal, and other secondary operations to remove sharp edges and obtain a desired finish.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A method of manufacturing a tubular input rod for use in a brake system including a vacuum brake booster and a pedal linkage member comprising the steps of:
   (a) providing a flat blank having opposed edges; and
   (b) forming at least a portion of the blank into a tubular input rod having opposed edges that are adjacent to one another, wherein the tubular input rod is adapted be connected between a vacuum brake booster and a pedal linkage member in a brake system.

2. The new method defined in claim 1 including the further step of forming at least a portion of the blank into a connecting member that is adapted to be connected to either a vacuum brake booster or a pedal linkage member.

3. The method defined in claim 1 including the further step of forming at least a portion of the blank into a spherical end.

4. The method defined in claim 1 including the further step of welding the opposed edges to define a seam that prevents separation thereof.

5. The method defined in claim 1 including the further step of forming the opposed edges of the seam with a mechanical lock feature that prevents separation thereof.

6. A method of manufacturing a brake system comprising the steps of:
   (a) providing a vacuum brake booster;
   (b) providing a pedal linkage member;
   (c) manufacturing a tubular input rod by (1) providing a flat blank having opposed edges, and (2) forming at least a portion of the blank into a tubular input rod having opposed edges that are adjacent to one another; and
   (c) connecting the tubular input rod between the vacuum brake booster and the pedal linkage member.

7. The method defined in claim 6 including the further step of forming at least a portion of the blank into a connecting member that is adapted to be connected to either a vacuum brake booster or a pedal linkage member.

8. The method defined in claim 6 including the further step of forming at least a portion of the blank into a spherical end.

9. The method defined in claim 6 including the further step of welding the opposed edges to define a seam that prevents separation thereof.

10. The method defined in claim 6 including the further step of forming the opposed edges of the seam with a mechanical lock feature that prevents separation thereof.

* * * * *